United States Patent [19]

Myer

[11] 3,758,753

[45] Sept. 11, 1973

[54] OPTICAL CODE READER SYSTEM

[75] Inventor: Jon H. Myer, Woodland Hills, Calif.

[73] Assignee: Hughes Aircraft Company, Culver City, Calif.

[22] Filed: July 16, 1971

[21] Appl. No.: 163,188

[52] U.S. Cl. ...... 235/61.11 E, 340/146.3 F, 250/233

[51] Int. Cl. ............ G06k 7/10

[58] Field of Search ............ 235/61.11 E; 340/146.3 F; 250/233, 236

[56] References Cited

UNITED STATES PATENTS

| | | | |
|---|---|---|---|
| 3,457,422 | 7/1969 | Rottmann | 340/146.3 F |
| 2,873,381 | 2/1959 | Lauroesch | 250/236 |
| 3,061,730 | 10/1962 | Jankowitz | 250/233 |
| 3,002,098 | 9/1961 | Watkins | 250/233 |
| 3,244,885 | 4/1966 | McHenry | 250/233 |
| 3,278,750 | 10/1966 | Eissfeldt | 250/236 |
| 3,600,556 | 8/1971 | Acker | 235/61.11 E |
| 3,218,441 | 11/1965 | Dersch et al. | 235/61.11 E |

*Primary Examiner*—Maynard R. Wilbur
*Assistant Examiner*—Robert F. Gnuse
*Attorney*—W. H. Mac Allister, Jr., and George Jameson

[57] ABSTRACT

An optical system for reading graphic codes in two dimensions, regardless of their angular orientation or position in a planar aperture where, in one embodiment, the image of a multibit, multicolumn graphic code is illuminated by a light source, slowly rotated by a rotating "K" mirror assembly and rapidly scanned by a rotating mirror drum which sequentially projects each of the multibit columns first onto a slit where the image of each of the rotationally aligned multibit columns is detected by a first electro-optical detector and then after a fixed time delay into an array of electro-optical detectors where the bits in each of the multibit columns are detected. In response to the rotationally aligned image of each multibit column of the graphic code, the first electro-optical detector generates a signal which allows the array of electro-optical detectors to read out the multibit information contained in each column of the graphic code.

5 Claims, 7 Drawing Figures

United States Patent [19]
Myer
[11] 3,758,753
[45] Sept. 11, 1973
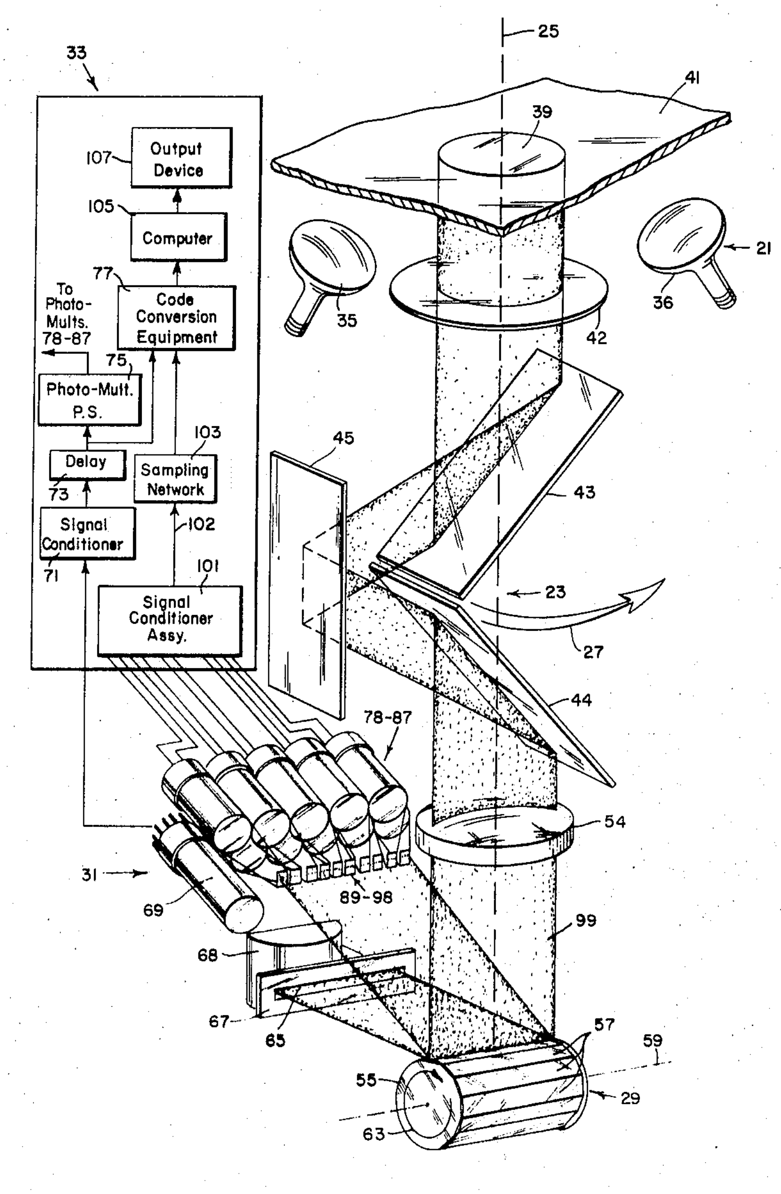

OPTICAL CODE READER SYSTEM

BACKGROUND OF THE INVENTION

1. Field of the Invention

This invention relates to optical code reading systems and particularly to an optical system for reading a graphic code on a label in two dimensions in order to increase the information storage capacity of the label.

2. Description of the Prior Art

In many commercial and military activities, large quantities of items must be inventoried, cataloged and tabulated. For example, grocery stores, factories, supply depots, warehouses and other commercial businesses must properly handle these large quantities of items as accurately and expeditiously as practicable to ensure that the items are correctly billed and/or inventoried. Generally, the inventorying, cataloging and tabulating are manually accomplished and, as a result, may require the need for a sizeable work force for relatively long periods of time with a resultant greater opportunity for introducing human error into these activities.

Various mechanical and electronic code and character reading schemes have been proposed heretofore as substitutes for the wearisome and time-consuming task of manually cataloging and tabulating great quantities of goods, but such proposed alternatives have generally been unacceptable due to a combination of factors such as cost, complexity of construction, difficulty in maintenance, and lack of simple mode of operation. When the items to be inventoried by these proposed systems are given some kind of code marking or information, a critical orientation of each such coded item is necessary for the code to be read.

A video scanning technique using a television camera or the equivalent is among the more widely known possible code and character reading schemes. This technique, however, involves such disadvantages as expense, complexity, the need for highly trained technicians to perform relatively frequent maintenance, and the short useful life of the camera electro-optical components. Furthermore, the inherent frame storage time of the vidicon in the television camera makes the vidicon an impractically slow detector.

Other proposals have been directed to the employment of magnetic techniques. Such proposals, however, have generally involved complex systems which comprise component parts subject to wear and having limited useful lives such as, for example, reading heads which are abraded by the oxide coated tape. Additionally, such techniques are susceptible to the accidental erasure of recorded information by spurious magnetic fields.

Various systems employing light energy have been proposed. For example, in one system an optical scanner is positioned to view a counter surface upon which coded articles may be placed for reading. These systems have generally been unacceptable due to problems involving difficulty in focusing due to varying target distances, which difficulties have resulted in reduced speed of operation and the need for an automatically adjustable lens system. Expense and complexity of construction leading to increased maintenance cost have also resulted in practical disadvantages. The greatest disadvantage, however, has been the requirement that the coded object to be read be oriented in a particular predetermined position and angular orientation relative to the scanning light beam of the reading apparatus. For example, the code or characters to be read must necessarily be situated orthogonal to the direction of scan, in order to cope with the inherent orientation sensitivity of the system.

In order to solve the problem or orientation, efforts have been directed toward the development of coding techniques for identifying goods. These efforts, while leading to advances in the art of coding, have generally been unsuccessful in providing an acceptable solution. Of the many coding techniques developed as a result of the aforementioned efforts, the most familiar technique involves color coding the indicia to be read.

One recently developed type of optical code reader system, as described in co-pending patent application, Ser. No. 718,981, filed Mar. 27, 1968, and having the same inventor and assignee as in this present patent application, solved the problem of orientation. In that optical code reader system a directive graphic code, consisting of a series of solid juxtaposed bars where each bar represents a bit of information to be read, is positioned within an aperture, and a beam pattern of light is swept across the aperture in a manner such that the sweep of the light beam is rotated through a predetermined angular increment after each succeeding sweep. The aperture is thus successively scanned in a plurality of different directions and the information contained in the series of juxtaposed bars is read out, detected and utilized without regard to the physical orientation of the graphic code within the aperture. The graphic code and mechanization of this system is designed to read out the information in only one dimension. As a result, this system is limited in the amount of one dimensional bar-coded information that can be accommodated on, for example, a standard ¾ inch square label.

SUMMARY OF THE INVENTION

Briefly, applicant has provided an optical system for reading graphic codes in two dimensions whereby the image of each multibit column of the graphic code is illuminated, rotated by a rotating "K" mirror assembly and focused by a lens onto an orthogonally-positioned, rotating mirror drum, which scans the rotationally aligned image first through a slit into a photomultiplier circuit and then into an array of electro-optical detectors which are enabled by a signal from the photomultiplier circuit to read out the multibit information contained in each column of the graphic code.

It is therefore an object of this invention to provide an improved optical code reader system.

Another object of this invention is to provide an optical system for reading a multibit graphic code placed within the periphery of an aperture, regardless of the angular orientation or position of the code within the aperture.

Another object of this invention is to provide an optical code reader system which can accommodate a graphic code scheme containing, for example, in excess of 22 decimal digits together with the equivalent arabic numerals on a standard ¾ inch square adhesive label used in retail stores.

Another object of this invention is to provide an optical system for reading graphic codes in two dimensions.

A further object of this invention is to provide a relatively simple, compact and economical optical code reader system.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views wherein.

DESCRIPTION OF THE PREFERRED EMBODIMENTS

Figures 1, 5, 6:
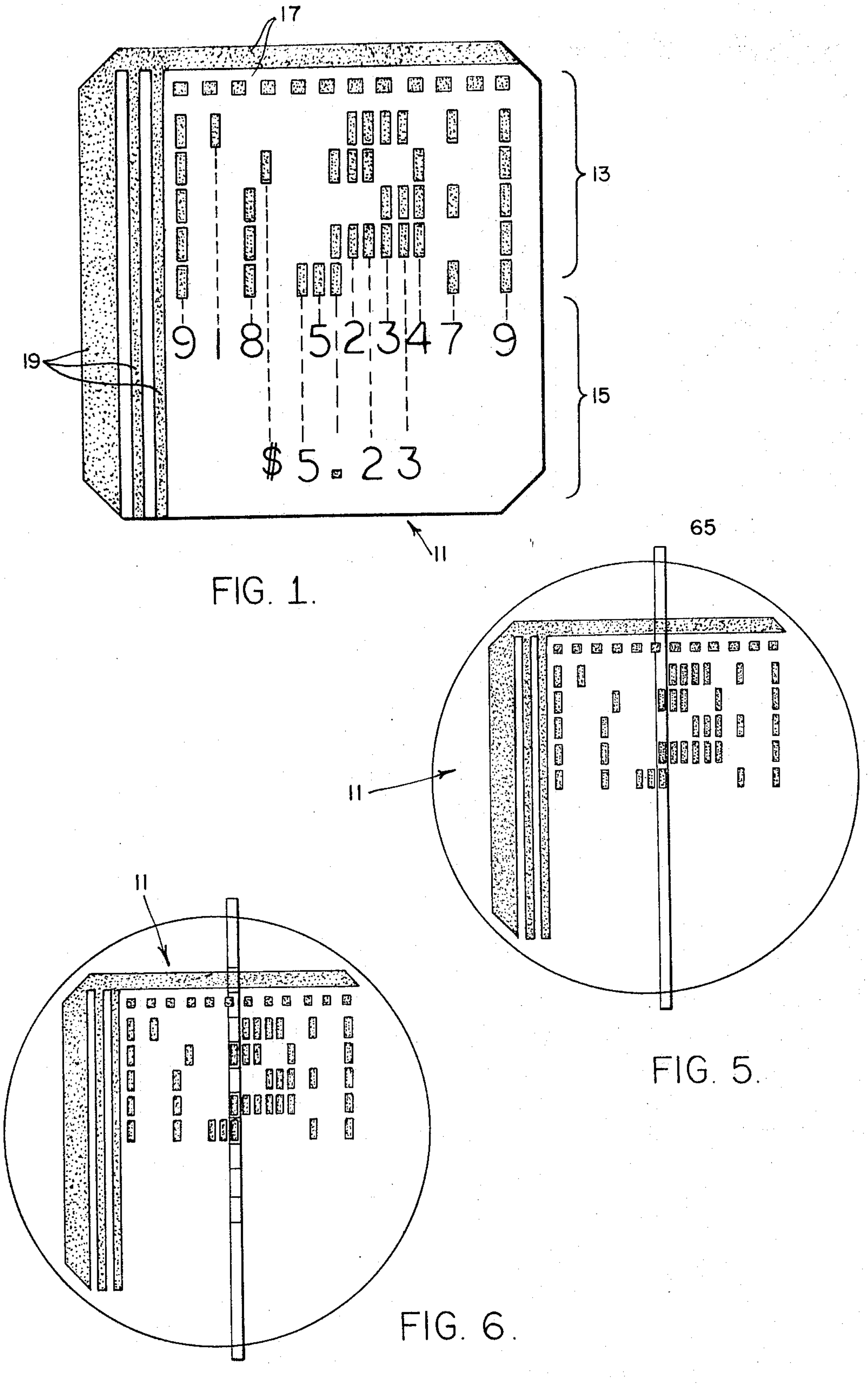
FIG. 1 is a graphical illustration of a label with a preferred code format including two orthogonally positioned frame marker strips, a plurality of binary-coded columns and optional arabic numerals equivalent to and representing the binary-coded columns.
FIGS. 5 and 6 illustrate those portions of the code format of FIG. 1 that are selectively seen by the detectors in the two dimensions in accordance with the invention.

Referring now to the drawings, an example of a graphic code, containing binary information to be read, which may be utilized in conjunction with the optical code reader system of this invention is shown in FIG. 1. This exemplary graphic code may be imprinted on one surface of, for example, a standard ¾ inch square label 11 having an adhesive backing (not shown) to enable the label to be adhered or fastened to a surface of an item to be inventoried, cataloged or tabulated. More specifically, the coded label 11 is divided into two areas 13 and 15. The area 13 contains the coded information to be read in columns of multibit binary quantities or codes, while the area 15 contains the same information in, for example, green-colored arabic numerals for ease of human reading. Since the width of one column of binary code is too narrow to permit simultaneous printing of the equivalent arabic numeral underneath, the numbers, as well as the dollar sign and period, are staggered with alternate code columns as shown in FIG. 1. On the particular label 11 shown, dotted lines are drawn between each of the coded columns in the area 13 and the center of each of the numerals and symbols in the area 15 to show the juxtaposition between each of the coded columns and its corresponding numeral or symbol.

FIG. 1 illustrates the information that may be contained on the label 11. The number 918 may designate the warehouse location of the selected item, the number 523479 may designate the item's stock number and the $5.23 may disclose the selling price of the item. It should be understood, however, that if more information is required to be on a label, both the areas 13 and 15 could contain multibit columns of binary words in any desired code format.

The binary coded multibit columns in the area 13 comprise an arbitrarily selected code format which contains odd parity checks (by making the number of bits in each column come out odd) for increased reliability upon readout. Each of the multibit columns contains two pigmentation densities which contrast with one another to form a digital word. For example, the bits representative of a ONE are black and the other bits representatives of a ZERO are formed by the backing material and are white. However, they could be imprinted with different pigments such as fluorescent colors which contrast with one another, or they could be treated with different materials which respond in a contrasting manner when scanned. Furthermore, the multibit columns do not have to be linear in all embodiments thereof. Notably, while the illustrated code configuration includes a plurality of parallel multibit columns, a plurality of parallel diagonal multibit columns may be employed as well. Additionally, curved multibit segmented lines may be employed instead of the linear arrangement depicted. It should, however, be realized that commensurate, but obvious, changes in the embodiments to be subsequently discussed would have to be made to accommodate the above modifications to the illustrated code format.

The multibit, multicolumn code format shown in FIG. 1 also includes an inhibit preamble 17 comprising, for example, one thick bar and one segmented thin bar which are parallel to each other and spaced apart. Further included in the code format is an enable preamble 19 comprising, for example, one thick bar and two thin bars which are all in parallel with each other and spaced apart. When the enable preamble is properly oriented, as will be discussed later, the optical code reader system of the invention is enabled to read out the code format from the label 11.

The inhibit preamble 17 is used to prevent the code format of the label 11 from being read out by the optical code reader system if the label 11 is orthogonally oriented to its correct readout position, since without the inhibit preamble 17 the parallel rows of bits that could be formed from the multibit columns may appear to the optical code reader system as a meaningful code and may mislead it into an error scan.

Figure 2:
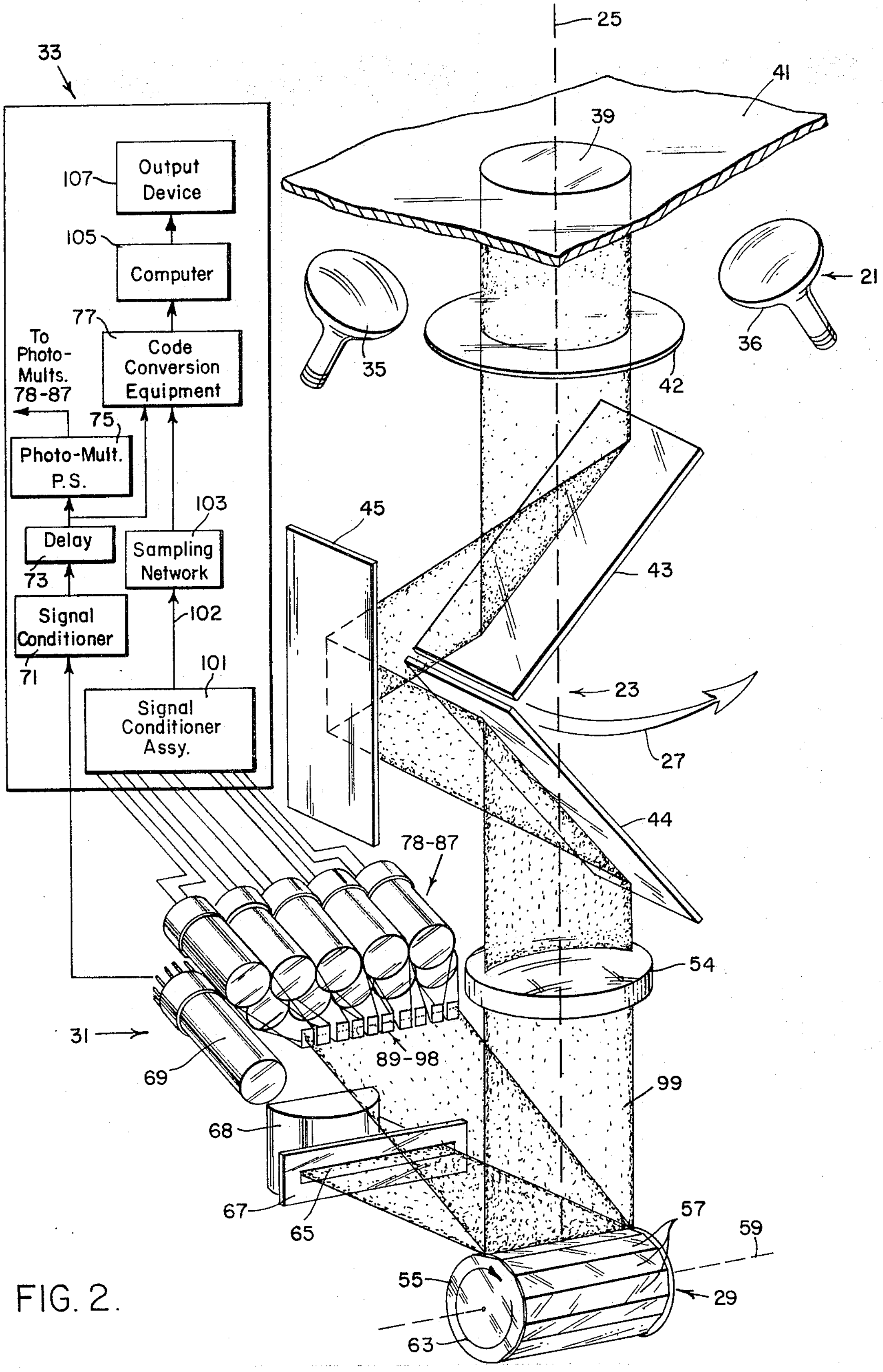
FIG. 2 is an isometric schematic diagram illustrating an optical code reader system in accordance with a preferred embodiment of this invention.
Figure 3:
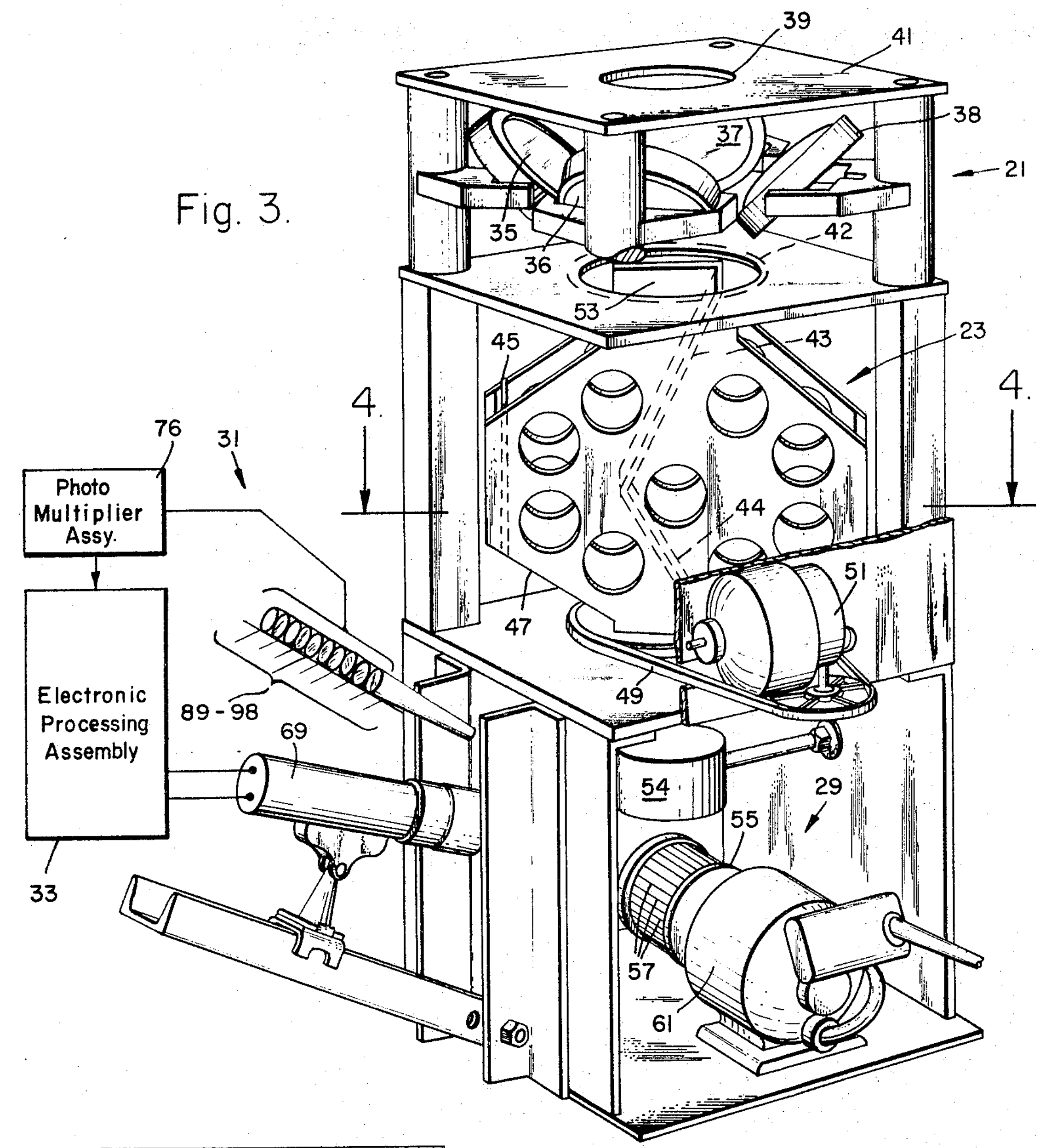
FIG. 3 pictorially shows the relative placement of some of the components of the preferred embodiment of this invention that is illustrated in FIG. 2.
Figure 4:
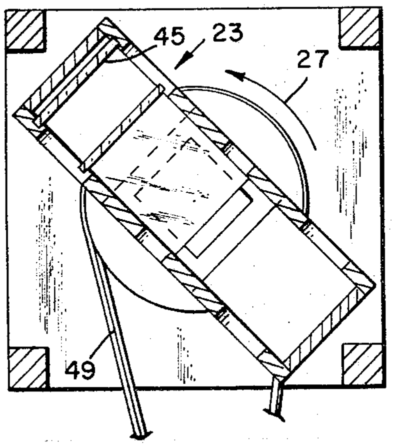
FIG. 4 illustrates a cross-sectional view along the line 4—4 of FIG. 3.
Figure 4A:
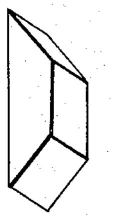
FIG. 4A illustrates a reflecting prism which may be used in place of the mirror complex shown in the preferred embodiment of FIGS. 2, 3 and 4.

Referring to the details of several types of optical code reader, FIGS. 2, 3 and 4 disclose a preferred embodiment of an optical code reader in accordance with the invention. More specifically, FIG. 2 illustrates an isometric schematic diagram of the preferred embodiment, FIG. 3 illustrates in more detail the electromechanical components and their relative placement in relation to the preferred embodiment, and FIG. 4 illustrates a cross-sectional view along the line 4—4 of FIG. 3. FIG. 4A illustrates a reflecting prism which may be used in place of the mirror complex shown in the preferred embodiment of FIGS. 2, 3 and 4. For a better understanding of the preferred embodiment of this invention, FIGS. 2, 3 and 4 of the drawings will now be jointly discussed.

The major components of the preferred embodiment of this optical code reader system include: an illuminating source assembly 21 for illuminating an object coded with a multibit, multicolumn graphic code; beam rotator optics 23 for rotating reflected light images of the graphic code on the coded object about an optical axis 25 in a direction such as indicated by the arrow 27; beam scanner optics 29 for causing each of the multicolumns of the reflected light images of the graphic code to be scanned in a direction transverse to the relative position of its corresponding column on the coded object; a multisensor light sensitive means 31 for selectively reading out the multibit, multicolumn graphic code in two dimensions; and an electronic processing assembly 33 for controlling the readout of the multibit columns of the graphic code and for processing the binary information derived from the graphic code.

The illuminating source 21, which may consist of a source of light or other radiant energy, is shown, for example, being comprised of conventional types of lamps 35 through 38 (FIG. 3). The lamps 35 through 38 are situated adjacent to a target area or aperture 39 in order to illuminate a graphic code, such as that illustrated in FIG. 1, stamped on or affixed to a coded object (not shown) which is placed on or in close proximity to a surface 41 and within the periphery of the aperture 39 for the purpose of being read.

The reflected light image of the illuminated graphic code is passed through a green filter 42 before being applied to the beam rotator optics 23, in order to remove the arabic numerals from subsequent processing by the system of the invention since the arabic numerals are not required for optical detection of the code.

The beam rotator optics 23 may include, for example, a reflecting prism, as shown in FIG. 4A, characterized by the quality of totally internally reflecting incident light rays an odd number of times prior to emergence therefrom. Such a reflecting prism may be a Dove or Pechan prism, both of which are described in the McGraw-Hill Encyclopedia of Science and Technology, McGraw-Hill Book Co., Inc., 1960, Vol. 8, page 508. As an alternative to a reflecting prism, a mirror complex constructed to simulate the characteristics of the aforesaid prism may be employed in the beam rotator optics 23. The use of such a mirror complex is particularly suitable in cases where a large prism would be required, but impractical due to the prism weight and the difficulty in obtaining a flawless prism. A mirror complex, such as described above, is utilized in the preferred embodiment of this invention depicted in FIGS. 2, 3 and 4. In these FIGURES the beam rotator optics 23 includes three reflecting elements such as first surface mirrors 43, 44 and 45 having planar reflecting surfaces. The mirrors 43 through 45 are oriented relative to each other in a K-shaped mechanical configuratioon wherein the mirrors 43 and 44 are aligned in end-to-end generally angular adjacency with the planar reflecting surfaces oriented in a plane with one axis orthogonal to the optical axis. The optical axis 25 of the beam rotator optics 23 (FIG. 2) extends through points in the mirrors 43 and 44, respectively, which points are preferably equidistant from the respective edges of the mirrors 43 and 44. Mirror 45 is situated parallel to the axis 25 and positioned at a distance from the apex of mirrors 43 and 44 symmetrically therewith. Each of the mirrors 43, 44 and 45 may be suitably mounted and retained in an appropriate housing 47 (FIG. 3) adapted to be rotated about a mechanical axis, which in this case is the optical axis 25, for example, by a pulley 49 driven by a suitable motor 51. The housing 47 can include two openings respectively located at an upper end 53 (FIG. 3) and a lower end (not shown). The reflected light images of the graphic code in the aperture 39 pass through the filter 42 into the opening in the upper end 53, and then are sequentially reflected from mirror 43 to mirror 45 to mirror 44 before exiting from the opening in the lower end of the housing 47. An exemplary angle usable between the mirrors 43 and 44 would be 120°; however, this angle may be varied as is practical and desirable to modify the physical configuration of the K-mirror complex.

Characteristically, reflected light images entering the opening in the upper end 53 of the housing 47 will be optically rotated about the optical axis 25 by the beam rotator optics 23 through an optical angle twice the mechanical rotation angle of the beam rotator optics 23. For example, if the beam rotator optics 23 is rotated 45°, images entering the upper end 53 of the housing 47 will be rotated 90° upon emerging from the lower end (not shown) of the housing 47. It is therefore apparent that the rotation of the beam rotator optics 23 about its mechanical axis, which is coaxial with the optical axis 25, will cause the reflected light image from the graphic code, upon passage through the reflecting mirror complex retained in the housing 47, to be angularly rotated about a center point by means of the pulley 49 driven by the motor 51.

It is the rotation of the reflected light image of the graphic code about the axis 25 which allows the optical code system to read the multibit graphic code placed within the periphery of the aperture 39, regardless of the angular orientation or position of the code within the aperture.

The rotating reflected light image of the graphic code may be focused by a lens 54 before it is received by the beam scanner optics 29. The beam scanner optics 29 may include, for example, a mirror drum 55 with a polygonal periphery having affixed thereto a plurality of flat reflecting elements such as first surface rectangular mirrors 57 which are uniformy secured in juxtaposed relationship, each mirror 57 extending the full length of the drum 55 so as to provide a polygonal reflecting surface or facet on the circumference of the drum 55. The drum 55 is rotated about its longitudinal axis 59 by a suitable motor 61 (FIG. 3) in a direction indicated by the arrow 63. Assume, for illustrative purposes, that there are 32 mirrors or facets 57 on the mirror drum 55, that the mirror drum 55 is rotated at a rate of 1,800 rpm (revolutions per minute) or 30 rps (revolutions per second), and that the beam rotator optics 23 is rotated at a rate of sixty rpm. Since the rotating image emerging from the beam rotator optics 23 will rotate at twice the physical rate of rotation of the beam rotator optics 23, or 120 rpm, the rotating image will make two revolutions every second (2 rps). Furthermore, since the mirror drum 55 has 32 facets and rotates at 30 rps, it passes 960 images every second in front of the slit 65. Thus, for every revolution of the image, 480 images will pass in front of the slit 65, or the entire code of FIG. 1 will be completely scanned during each angular increment of ¾° of rotation of the beam rotator optics 23. It should be noted that the images will pass the slit 65 at twice the physical rate of rotation of the mirror drum 55, thereby resulting in a doubling of the signal frequency subsequently detected. It should also be noted that greater or less angular increments than ¾° may be chosen by changing the speed of rotation of the beam rotator optics 23 and/or the mirror drum 55. However, if it is desired to maintain the angular increment at ¾°, any change in the speed of, for example, the beam rotator optics 23 must be accompanied by a proportionate change in the speed of the mirror drum 55. For example, if the speed of the beam rotator optics 23 is doubled, the speed of the mirror drum 55 must be doubled in order to maintain the angular increment at ¾° about the axis 25. It is advisable to keep the angular increment as small as practically possible to assure acquisition of the scanned code.

Each reflected image that is received from the beam rotator optics 23 via the lens 54 is scanned by the mirror drum 55 through an elongated slit 65 of an opaque mask 67. While the slit 65 is illustrated in FIG. 2 in a bar or rectangular shape, the slit 65 may have any other suitable shape, such as that of a curved line. This may be desirable if the multibit lineal indicia forming a graphic code to be read are other than straight bar shaped, since the use of a slit-shape which matches or generally conforms to the configuration of the multibit lineal indicia provides maximum variations in the reflected light intensity. Of course, if both the graphic code to be read and the slit 65 had another suitable shape such as that of a curved line, then the scan will acquire such a code only once during an image revolution and may not require either an enable or inhibit preamble.

The distance from the slit 65 to that line on the mirror drum 55, from which the reflected image is projected in focus to the slit 65, is determined by the location and focal length of the lens 54. The length and width of the slit 65 is determined by the length of the enable preamble 19 and the width of a multibit bit column of the graphic code, as focused on the slit 65 by the lens 54.

The pattern of the reflected image is scanned by each mirror 57 on the mirror drum 55 through the slit 65 onto a suitable first detector or photomultiplier 69, which is part of the light sensitive means 31. Suitable aspherical focussing means 68 can be inserted between the slit 65 and the photomultiplier 69 to concentrate thelight passing through the slit 65. The photomultiplier 69 converts the light energy impinging thereon into electrical signals which are then applied to a signal conditioner 71 in the electronic processing assembly 33 (FIG. 2). The signal conditioner 71 may be any conventional circuit which clips, shapes, reduces the noise in the output signal from the photomultiplier 69 and distinguishes between high and low frequency components of the photomultiplier output. Such a signal conditioner basically enhances the high signal frequency components and attenuates the low background frequency components of the photomultiplier 69 output signal by filter means well-known in the art. In its most simple form the signal conditioner 71 may be a cut-off filter or capacitor serially coupled to the photomultiplier 69, which allows no lower frequency noise or pulses therethrough and only passes higher frequency signals.

It should be recalled that the mirror drum 55 makes 960 scans of the reflected image for each complete revolution of the reflected image. During one of those 960 scans, the enable preamble 19 (FIG. 1) and the multibit columns parallel thereto are in substantially parallel alignment with the slit 65. It is only during this one scan and its nearest adjacent neighboring scans out of each 960 scans that the photomultiplier 69 and signal conditioner 71 combination develops a high frequency sequence or burst of pulses at the output of the signal conditioner 71. A symmetrical event takes place when the image of the multibit columns of the graphic code are substantially parallel to the slit 65 but are scanned in reverse, with the enable preamble 19 being scanned last. In this case, even though the high frequency pulse burst will be passed by the signal conditioner 71, code conversion equipment 77 (to be discussed later) will inhibit further processing of this preamble-less code scan. Similar inhibition by the code conversion equipment 77 will take place during the meaningless orthogonal scans. This inhibition can also be enhanced by the inhibit preamble 17.

Each short signal burst that is developed by the signal conditioner 71 is electronically delayed for a predetermined time (to be discussed later) by a delay circuit 73 before being applied to a photomultiplier power supply 75. In response to each signal burst received from the delay circuit 73, the power supply 75 furnishes a voltage to a second detector or photomultiplier assembly 76 of the light sensitive means 31. This second detector includes a plurality of photomultipliers 78 through 87. A plurality of conical-to-rectangular light pipes or fiber optic bundles 89 through 98 have their conical ends cemented to the optical ends of the photomultipliers 78 through 87, respectively, in a manner well-known in the art. The lengths of the rectangular ends of the fiber optic bundles 89–98 are adjacently aligned in a sequence such that the combined length of the resultant assembly, as well as the width thereof, have the same length and width as that of the slit 65. Furthermore, the rectangular ends of the fiber optic bundles 89–98 are positioned in the focal plane of the lens 54, as was the slit 65. However, the rectangular ends are angularly displaced upward from the slit 65.

In operation, the code located at the aperture 39 is first imaged at the slit 65 and then, after the mirror drum 55 has rotated through a preselected angle of rotation, the code is imaged at the ends of the fiber optic bundles 89–98. It should be recalled that the output of the signal conditioner 71 was electronically delayed for a predetermined delay time by the delay circuit 73 before being applied to the photomultiplier power supply 75. This predetermined delay time of the delay circuit 73 is equal to the mechanical time delay incurred as the mirror drum 55 scans the reflected image from the slit 65 to the rectangular ends of the bundles 89–98. Another way this could be stated is that the time delay of the circuit 73 is equal to the mechanical time delay of the mirror drum 55 as it rotates through the angle between the first and second detectors of the light sensitive means 31.

At the time the mirror drum 55 is imaging the reflected image of the graphic code into the rectangular ends of the bundles 89–98, the delayed output of the delay circuit 73 enables the power supply 75 to furnish voltages to the photomultipliers 78–87 to enable them to detect the bits of each of the multibit columns. It should be noted at this time that a reflected light path 99 for one multibit column is shown in FIG. 2 as it passes through the filter 42, the beam rotator optics 23, the lens 54, and as it is scanned by the rotating mirror drum 55 into the slit 65 and then into the rectangular ends of th bundles 89–98. Any light energy passing through the bundles 84–88 is detected by the photomultipliers 78–87.

It is necessary to have more than five photomultipliers and their attached individual fiber optic bundles in order to assure acquisition of laterally displaced codes. The ten photomultipliers 78–87 and their respective fiber optic bundles 89–98 were selected to be illustrated, although a greater or lesser number could have been chosen, as long as the combined length of the selected number of adjacently aligned rectangular ends of fiber optic bundles is equal to the physical length of the slit 65.

The detected outputs of the photomultipliers 78–87 are then applied to a signal conditioner assembly 101 which is comprised of a group of 10 signal conditioners, each being similar in structure and function to the signal conditioner 71. The signal conditioner assembly 101 passes the high signal frequency components and attenuates the low background frequency components of the outputs of the photomultipliers 78–87. It should be noted that two of the photomultipliers may look at the bars in the inhibit preamble 17 (FIG. 1) as the mirror drum 55 scans the eflected image of the graphic code past the ends of the fiber optic bundles 89–98. As a result, one long output at a wrong or lower frequency and one segmented output at a different (which may be higher) frequency are developed by the two photomultipliers. Only the long output from the solid bar in the inhibit preamble 17 is filtered out by its associated signal processor in the assembly 101. The segmented output developed from the segmented portion of the inhibit preamble 17 is passed by its associated signal processor in the assembly 101 and will be further discussed later.

The high signal frequency components at the output of the assembly 101 are applied through a composite line 102 to a sampling network 103. The sampling network 103 may be either a serial or a parallel sampler. If a serial sampler were used, it would process the filtered multibit information from the assembly 101 in a serial sequence. A typical example of a serial sampler is the MMUX Series Eight Channel Multiplexer, manufactured by DDC, a division of Solid State Scientific Devices Corp., located in Hicksville, N. Y. If a parallel sampler were used, it would process the filtered multibit information in a parallel sequence as it was received from the assembly 101. In any event, the multibit output of the sampling network is applied to the code conversion equipment 77, which performs the desired code conversion from, for example, a binary to a decimal format.

The code conversion equipment 77 is composed of conventional digital processing building blocks well-known in the art which will also enable it to disregard meaningless scans, carry out parity checks, accumulate several sequential scans for redundancy, and perform the decision function of selecting the set of five sensors which actually perform the scanning function on a laterally displaced code. The decoding techniques of the code conversion equipment 77 may be of a conventional type or may be similar to those described in patent application Ser. No. 108,626, filed on Jan. 21, 1971 as a continuation of now abandoned patent application Ser. No. 716,534 filed Mar. 27, 1968.

One way the selection function of the code conversion equipment 77 can be performed is by utilizing the segmented bar of the inhibit preamble 17. This segmented bar will cause the photomultiplier, which is monitoring it as the mirror drum 55 scans the image, to develop a different frequency of signal components or pulses than that developed by the other photomultipliers in the group of photomultipliers 78–87. This different frequency component, which is readily passed by its associated signal conditioner in the assembly 101 through the sampling network 103 into the code conversion equipment 77, tells the code conversion equipment 103 to only use or gate through the next five bits which represent the bits immediately below it, as illustrated in FIG. 1, and to disregard all of the other outputs from the photomultipliers 78–87. For example, if this different frequency signal is developed from the output of the photomultiplier 85, the equipment 77 will only use the outputs from the photomultipliers 80 through 84 and will disregard the outputs from the photomultipliers 78, 79, 85, 86 and 87. It is by this operation that the equipment 77 selects the five photomultipliers which perform the scanning function when the graphic code is laterally displaced. In the case where the imaged column bits straddle two adjacent fiber optic bundles, a preselected threshold level is set by threshold detection circuitry (not shown) in the equipment 77 for the determination of binary 1 and 0 signals entering the code conversion equipment 77.

The code conversion equipment 77 disregards meaningless scans by only responding to the coded (one long and two short) enable preamble 19 signals developed by the photomultiplier 69 in response to the one wide and two narrow bars and taken from the output of the delay circuit 73, when the reflected image is properly oriented in a substantially parallel alignment with the slit 65. It is at this time that the enable preamble activates the code conversion equipment, thereby enabling the equipment to acquire the encoded information from the five photomultipliers of the group 78–87 which are actually performing the scanning functions on the laterally displaced code, as mentioned previously. The code conversion equipment 77 does not respond to any other orientation of the graphic code, as previously discussed.

The output of the code conversion equipment 77 may be applied to a computer 105, which in turn directs the operation of an output device 107 such as a printer, a display unit or a memory unit.

Referring now to FIGS. 5 and 6, FIG. 5 illustrates the reflected image of the graphic code being in the proper orientation so that the multibit information contained in one of the columns of the code is focussed through the slit 65 in one dimension, as previously described. FIG. 6 illustrates how the rectangular ends of the illustrated fiber optic bundles 89–98 cover a multibit column so that the bits in the column can be detected by the appropriate ones of the photomultipliers 78–87 in an orthogonal dimension in the manner previously discussed.

The invention thus provides an optical system for reading graphic codes in two dimensions wherein a multibit, multicolumn graphic code is illuminated by a light source and the resultant reflected image of the code is slowly rotated by a K-mirror assembly and rapidly scanned by a rotating mirror drum first past a slit into a photoultiplier for detection in a first dimension and then into an array of photomultipliers where the bits in each of the multibit columns are detected in a second dimension orthogonal to the first dimension.

While the salient features have been illustrated and described it should be readily apparent to those skilled in the art that modifications can be made within the spirit and scope of the invention as set forth in the appended claims.

What is claimed is:

1. An optical system for reading a graphic code positioned within a target area having a first axis extending therefrom, the graphic code having a plurality of columns with each column containing a plurality of bits of information, said optical system comprising:

first means for causing light images of the graphic code to be developed;

second means situated along the first axis for continuously rotating the light images of the graphic code about the first axis;

third means for detecting the plurality of columns of the light images of the graphic code;

fourth means for detecting the plurality of bits of information in each column;

fifth means for repeatedly rotationally scanning the light images of the graphic code from said second means selectively into said third and fourth means; and Sixth means responsive to the proper alignment of the light images of the graphic code by said second means for enabling the plurality of bits of information in each column to be processed, said sixth means comprising: eighth means responsive to each of the detected plurality of columns of the light images from said third means for enabling said fourth means to detect the plurality of bits in each column after a predetermined time delay; and ninth means, coupled to said fourth means, being responsive to each of the detected plurality of columns of the light images from said third means for selectively allowing the plurality of bits in each column to be processed when the columns of a light image from said fifth means are substantially in a predetermined alignment with said third means.

2. An optical system for reading a graphic code positioned within a target area having a first axis extending therefrom, the graphic code having a plurality of columns with each column containing a plurality of bits of information, said optical system comprising:

first means for causing light images of the graphic code to be developed;

second means situated along the first axis for continuously rotating the light images of the graphic code about the first axis;

third means for detecting the plurality of columns of the light images of the graphic code;

fourth means for detecting the plurality of bits of information in each column, said fourth means comprising a plurality of photomultipliers for detecting the plurality of bits in each column of the graphic code;

fifth means for repeatedly rotationally scanning the light images of the graphic code from said second means selectively into said third and fourth means, said fifth means comprising a drum-shaped member having an external periphery, said member being rotated about its longitudinal axis at a faster rate than the light images are rotated about said first axis by said second means, and a plurality of reflecting means selectively mounted on the external periphery of said drum-shaped member, for sequentially scanning the rotating light images of the graphic code first through the aperture of said opaque mask to said first photomultiplier and then after a predetermined angular rotation into said plurality of photomultipliers, said third means comprising an opaque mask having an aperture of a preselected configuration through which said fifth means scans the rotated light images, and a first photomultiplier positioned adjacent to said opaque mask for receiving and detecting each of the plurality of columns in the graphic code in the light images being scanned by said fifth means; and sixth means responsive to the proper alignment of the light images of the graphic code by said second means for enabling the plurality of bits of information in each column to be processed, said sixth means comprising: eighth means responsive to each of the plurality of columns of the light images detected by said first photomultiplier for enabling said plurality of photomultipliers to detect the plurality of bits in each column after a predetermined time delay; and ninth means, coupled to said plurality of photomultipliers, being responsive to each of the detected plurality of columns of the light images from said first photomultiplier for selectively allowing the plurality of bits in each colunn to be processed therein when the columns of a light image from said plurality of reflecting means are substantially in a predetermined alignment with the aperture of said opaque mask.

3. The apparatus of claim 2 wherein said second means comprises:

a reflecting prism having the quality of internally reflecting the light images an odd number of times prior to emergence therefrom, said prism being axially aligned on the first axis; and seventh means for rotating said prism about the first axis.

4. The apparatus of claim 2 wherein said second means comprises:

first reflector means situated along the first axis at a first angle thereto for reflecting the light images of the graphic code in a first direction;

second reflector means situated parallel to the first axis for reflecting the light images of the graphic code from said first reflector means in a second direction;

third reflector means situated along the first axis at a second angle thereto for reflecting light images of the graphic code from said second reflector means in a third direction;

housing means for retaining said first, second and third reflector means in fixed positions relative to each other; and seventh means for continuously rotating said housing means about the first axis.

5. An optical system for reading a light reflective graphic code having first coded lines on a first edge, second coded lines on a second edge and a plurality of coded columns parallel to the first coded lines, each column having a plurality of bits, said system having an optical axis and comprising:

first means situated along the optical axis for rotating reflected light images of the graphic code about the optical axis;

second means responsive to the rotating reflected light images from said first means for scanning the first coded lines and the plurality of columns;

third means for detecting the first coded lines and the plurality of columns being scanned by said second means;

fourth means for detecting the plurality of bits in each column; and fifth means, operationally coupled to said first and second means, being responsive to the first and second coded lines for enabling the plurality of bits in each column to be processed when the first coded lines and the plurality of columns being scanned by said second means are substantially in a predetermined alignment with said third means.

* * * * *